(12) United States Patent
Yosiuti et al.

(10) Patent No.: US 7,658,118 B2
(45) Date of Patent: Feb. 9, 2010

(54) DISTORTION DETECTOR

(75) Inventors: Sigehiro Yosiuti, Osaka (JP); Shusaku Kawasaki, Osaka (JP); Hiroaki Mori, Fukui (JP); Yasunori Matsukawa, Fukui (JP); Yasunobu Kobayashi, Fukui (JP)

(73) Assignee: Panasonic Corporation, Osaka (JP)

( * ) Notice: Subject to any disclaimer, the term of this patent is extended or adjusted under 35 U.S.C. 154(b) by 239 days.

(21) Appl. No.: 11/663,284

(22) PCT Filed: Sep. 30, 2005

(86) PCT No.: PCT/JP2005/018110
§ 371 (c)(1),
(2), (4) Date: Mar. 20, 2007

(87) PCT Pub. No.: WO2006/038553
PCT Pub. Date: Apr. 13, 2006

(65) Prior Publication Data
US 2008/0245157 A1 Oct. 9, 2008

(30) Foreign Application Priority Data
Oct. 5, 2004 (JP) .............................. 2004-292224

(51) Int. Cl.
*G01L 1/22* (2006.01)
*G01B 7/16* (2006.01)
(52) U.S. Cl. ................ 73/862.044; 73/774; 73/862.045
(58) Field of Classification Search ................... 73/769, 73/862.044, 862.045
See application file for complete search history.

(56) References Cited

U.S. PATENT DOCUMENTS

| | | | |
|---|---|---|---|
| 4,762,006 A | 8/1988 | Asakawa et al. | |
| 4,862,751 A | 9/1989 | Asakawa et al. | |
| 5,640,178 A | 6/1997 | Endo et al. | |
| 5,991,676 A * | 11/1999 | Podoloff et al. ................ | 701/45 |
| 6,477,904 B2 * | 11/2002 | Maeda et al. .......... | 73/862.044 |
| 2003/0106723 A1 * | 6/2003 | Thakur et al. .......... | 73/862.632 |
| 2003/0174579 A1 * | 9/2003 | Rioux ......................... | 367/37 |
| 2004/0124018 A1 * | 7/2004 | Yanagi .................. | 73/862.634 |

(Continued)

FOREIGN PATENT DOCUMENTS

JP 61-083929 4/1986

(Continued)

*Primary Examiner*—Lisa M Caputo
*Assistant Examiner*—Punam Patel
(74) *Attorney, Agent, or Firm*—Wenderoth, Lind & Ponack, L.L.P.

(57) ABSTRACT

A strain detector includes a bridge circuit having at least two strain resistance elements, a substrate, a first fixed member, and a second fixed member. The substrate has a circuit portion electrically connected to the strain resistance elements. The strain resistance elements are arranged on the substrate. The first fixed member is fixed to a center of an area, where an outer periphery of the area is set at a position at which the strain resistance elements are arranged. The second fixed member is fixed outside the position, where the strain resistance elements are arranged at the substrate. A center of an axis of the first fixed member, a center of an axis of the second fixed member, and the center of the area are positioned on a straight line, and the first fixed member and the second fixed member are arranged on two mutually opposed surfaces of the substrate.

9 Claims, 12 Drawing Sheets

U.S. PATENT DOCUMENTS

2005/0023065 A1 * 2/2005 McBride et al. ............. 180/273
2005/0061643 A1 * 3/2005 Rainey .................... 200/85 A

FOREIGN PATENT DOCUMENTS

| JP | 8-87375 | 4/1996 |
| JP | 3243124 | 1/2002 |
| JP | 2002-257655 | 9/2002 |
| JP | 2004-152107 | 5/2004 |

* cited by examiner

DISTORTION DETECTOR

This application is a U.S. national phase application of PCT International Application PCT/JP2005/018110, filed Sep. 30, 2005.

TECHNICAL FIELD

The present invention relates to a strain detector for detecting strain generated by applying a load.

BACKGROUND ART

A conventional strain detector is disclosed in, for example, Japanese Patent Unexamined Publication No. H8-87375. FIG. 12 is a bottom view showing a conventional strain detector, FIG. 13 is a perspective view showing the strain detector, and FIG. 14 is a cross sectional view showing a state, in which the strain detector is mounted.

Insulating substrate (hereinafter referred to as substrate) 1 includes an elastic member and an insulating layer formed on the surface thereof. Insulating substrate 1 is fixed to a lower surface of push member 2. Four strain resistance elements (hereinafter referred to as elements) 3 are provided on a lower surface of insulating substrate 1. Four strain resistance elements 3 are electrically connected to a pair of source electrodes 4, a pair of output electrodes 5, and a pair of earthed electrodes 6. Thereby, a bridge circuit is constituted.

An operation of the conventional strain detector constructed as described above is discussed hereinafter. As shown in FIG. 14, the strain detector is fixed to fixed member 7 by screws 8 in use. When a push force is applied to an upper surface substantially centrally of insulating substrate 1 through push member 2, the push force generates a bending moment on insulating substrate 1. The bending moment generates a bending moment also on four elements 3 provided on the lower surface of insulating substrate 1. When the bending moment is generated on elements 3, elements 3 are varied in value of resistance. Such variation in value of resistance is output from pair of output electrodes 5 to an external computer (not shown), and a push force applied to substrate 1 is calculated.

In the conventional construction mentioned above, substrate 1 is clamped and fixed to fixed member 7 by screws 8. Therefore, a fixed position is displaced when a shock is applied, so that a fixed length constructed as a beam is varied and the strain detector is degraded in characteristics such as sensitivity and 0-point voltage.

DISCLOSURE OF THE INVENTION

The strain detector according to the invention includes a bridge circuit having at least two strain resistance elements, a substrate, a first fixed member, and a second fixed member. The substrate has a circuit portion electrically connected to the strain resistance elements. The strain resistance elements are arranged on the substrate. The first fixed member is fixed to a center of an area, where an outer periphery of the area is set at a position at which the strain resistance elements are arranged. The second fixed member is fixed outside the position, where the strain resistance elements are arranged, at the substrate. A center of an axis of the first fixed member, a center of an axis of the second fixed member, and the center of the area are positioned on a straight line, and the first fixed member and the second fixed member are arranged on two mutually opposed surfaces of the substrate. With this construction, the first fixed member and the second fixed member form a beam on the substrate. By fixing the first fixed member and the second fixed member integrally to the substrate, a fixed position is not displaced even when a shock is applied. Therefore, deviations in characteristics such as sensitivity and 0-point voltage are avoided in the strain detector of the present invention.

DETAILED DESCRIPTION OF PREFERRED EMBODIMENTS

Figure 1:
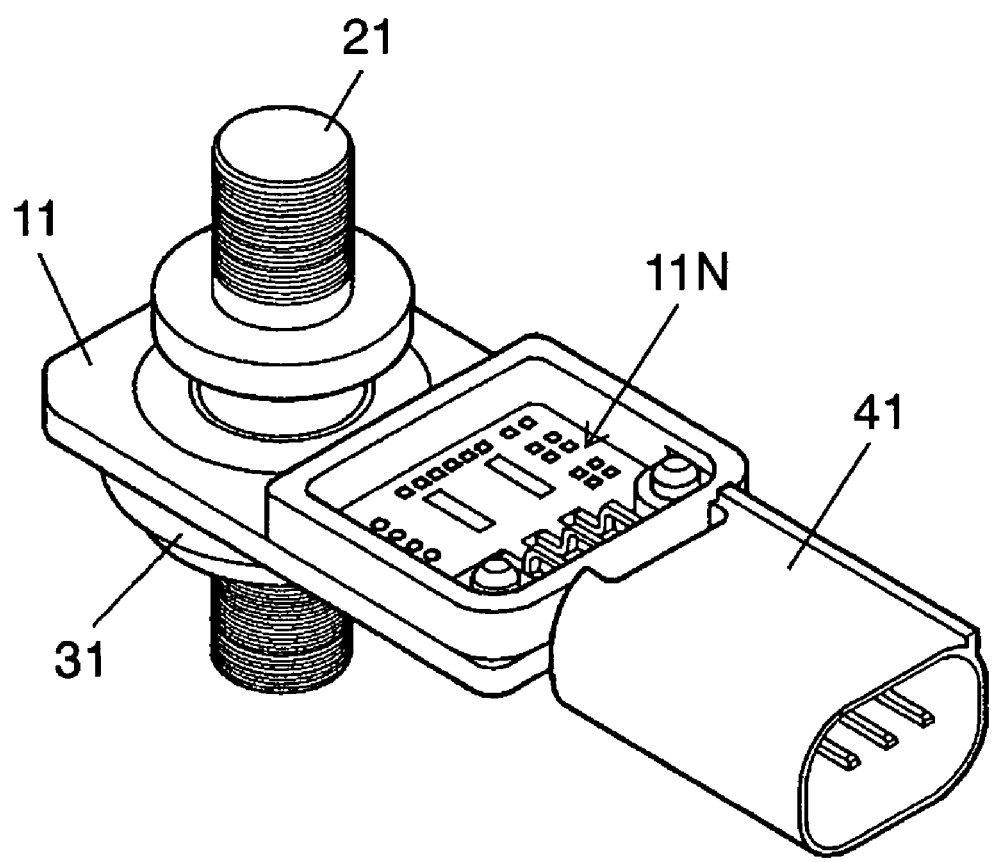
FIG. 1 is a perspective view showing a strain detector according to Embodiment 1 of the invention.

Embodiments of the invention will be described below with reference to the drawings. In addition, in respective embodiments, the same constituents as those in a preceding embodiment are denoted by the same reference numerals as those in the latter, and detailed descriptions are omitted.

Embodiment 1

Figure 2:
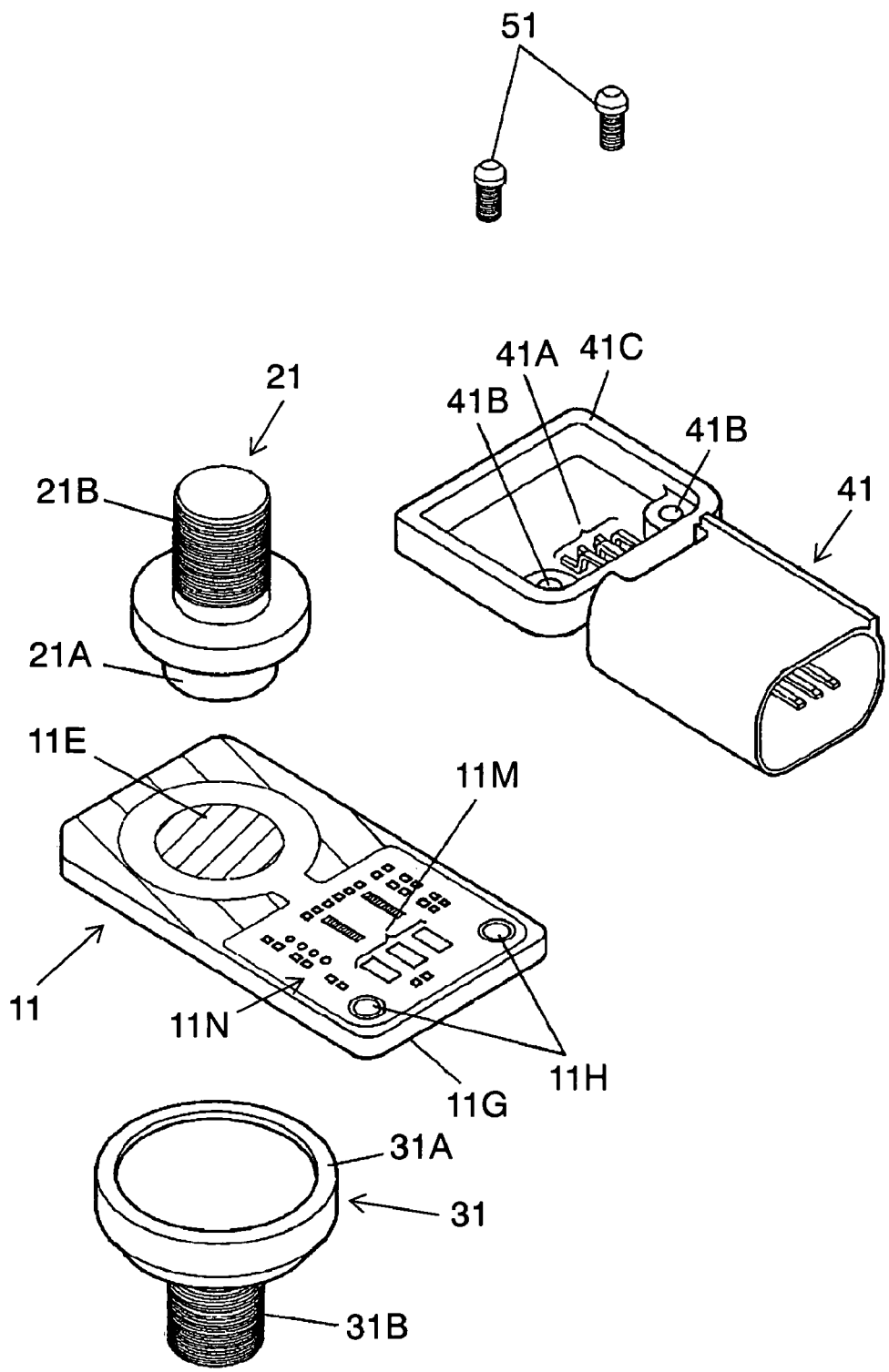
FIG. 2 is an exploded perspective view showing the strain detector shown in FIG. 1.

FIG. 1 is a perspective view showing a strain detector according to Embodiment 1 of the invention, FIG. 2 is an exploded perspective view showing the strain detector, and FIGS. 3A to 3E are views illustrating a process of fabricating a substrate in the strain detector.

In FIGS. 1 and 2, first fixed member (hereinafter referred to as fixed member) 21 is fixed to a first surface which is an upper surface of substrate 11 made of stainless steel. Second fixed member (hereinafter referred to as fixed member) 31 is fixed to a lower surface, which is a second surface opposed to the first surface, in a position in which an axis thereof corresponds to an axis of fixed member 21. Connector 41 is mounted to an end of substrate 11 to cover circuit portion 11N and to take out a signal.

Figure 3A:
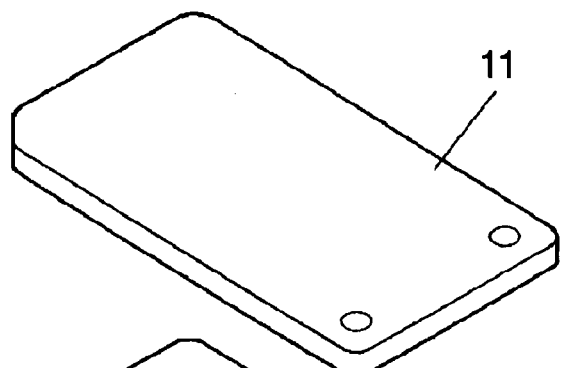
FIG. 3A is a perspective view illustrating a process of fabricating a substrate in the strain detector shown in FIG. 1.
Figure 3B:
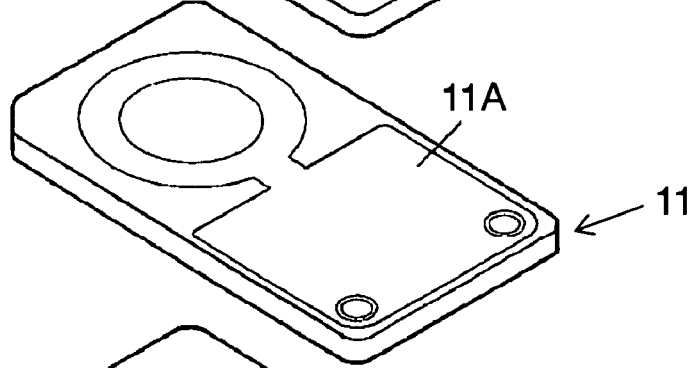
FIG. 3B is a perspective view illustrating a process subsequent to the process of FIG. 3A.
Figure 3C:
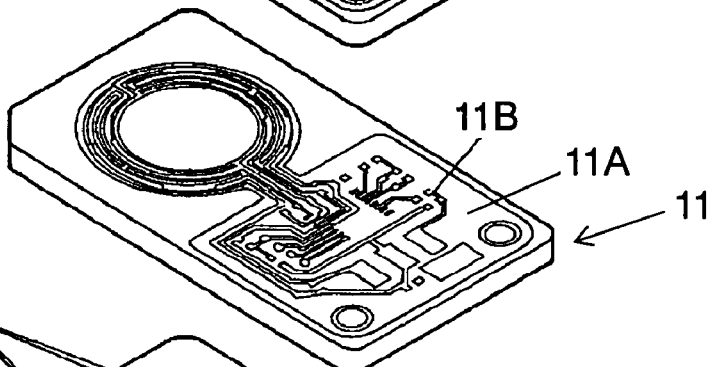
FIG. 3C is a perspective view illustrating a process subsequent to the process of FIG. 3B.
Figure 3D:
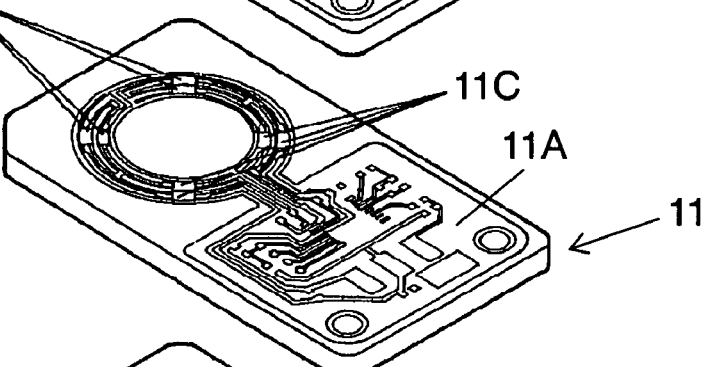
FIG. 3D is a perspective view illustrating a process subsequent to the process of FIG. 3C.
Figure 3E:
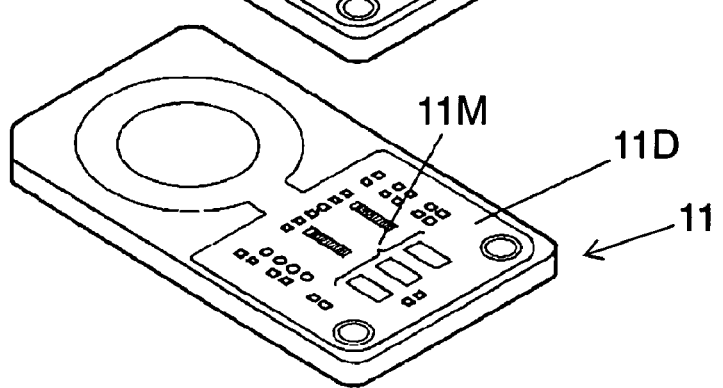
FIG. 3E is a perspective view illustrating a process subsequent to the process of FIG. 3D.

As shown in FIG. 3B, insulating layer 11A is formed on the first surface of substrate 11. As shown in FIGS. 3C and 3D, wiring electrode 11B and strain resistance elements 11C are provided on insulating layer 11A. Further, as shown in FIG. 3E, protective film 11D is laminated and formed on the strain resistance element. Strain resistance elements 11C are arranged on substrate 11 to be connected to circuit portion 11N.

As shown in FIG. 2, fixed member 21 includes columnar portion 21A and threaded portion 21B, a center of an axis of which substantially corresponds to a center of an axis of columnar portion 21A. Fixed member 31 includes ring-shaped convex portion 31A and threaded portion 31B, a center of an axis of which corresponds substantially to a center of an axis of convex portion 31A. Connector 41 is molded from, for example, a polybutylene terephthalate (PBT) resin, which contains glass fibers. Connector 41 includes at least frame 41C and three terminals 41A provided in frame 41C and is provided with mount holes 41B.

A method of assembling the strain detector composed of the constituent parts discussed above will be described. As shown in FIG. 3B, insulating layer 11A is printed on the upper surface of substrate 11 shown in FIG. 3A to be baked. Next, as shown in FIG. 3C, wiring electrode 11B is printed on insulating layer 11A to be baked. Further, as shown in FIG. 3D, four strain resistance elements 11C are printed and baked so as to constitute a bridge circuit with the use of wiring electrode 11B. As shown in FIG. 3E, protective film 11D is printed and baked so as to cover a portion except a land portion for mounting of circuit parts such as IC, and connecting electrodes 11M. Protective film 11D is provided to protect the respective layers as printed and baked from moisture or the like.

As shown in FIG. 2, substrate 11 and fixed member 21 are fixed integrally so that a center of area 11E for fixation, on substrate 11 substantially corresponds to a center of an axis of fixed member 21. Fixed member 21 is fixed to a central portion of area 11E on an upper surface side. At this time, for example, a laser is used to weld corner portions defined by area 11B and columnar portion 21A. Strain resistance elements 11C are arranged on an outer periphery of area 11E.

Likewise, fixed member 31 is arranged and fixed integrally in area 11G for fixation on a lower surface side of substrate 11 so that the center axis of fixed member 21 corresponds to a center of an axis of fixed member 31. At this time, for example, a laser is used to weld area 11G and convex portion 31A. Fixed member 31 is fixed outside those positions on substrate 11, in which strain resistance elements 11C are arranged. In this manner, the center of an axis of fixed member 21, the center of an axis of fixed member 31, a center of area 11E are positioned on a straight line. Fixed member 21 and fixed member 31, respectively, are arranged on two mutually opposed surfaces of substrate 11. An outer periphery of columnar portion 21A of fixed member 21 and convex portion 31A of fixed member 31, which are fixed in this manner, constitute a beam on substrate 11.

Connector 41 is fixed to hole 11H of substrate 11 through mount holes 41B by screws 51. Connecting electrodes 11M on substrate 11 are electrically joined to terminals 41A by soldering or the like. For example, a silicon resin preferably covers an interior of frame 41C in order to protect circuit portion 11N.

Figure 4:
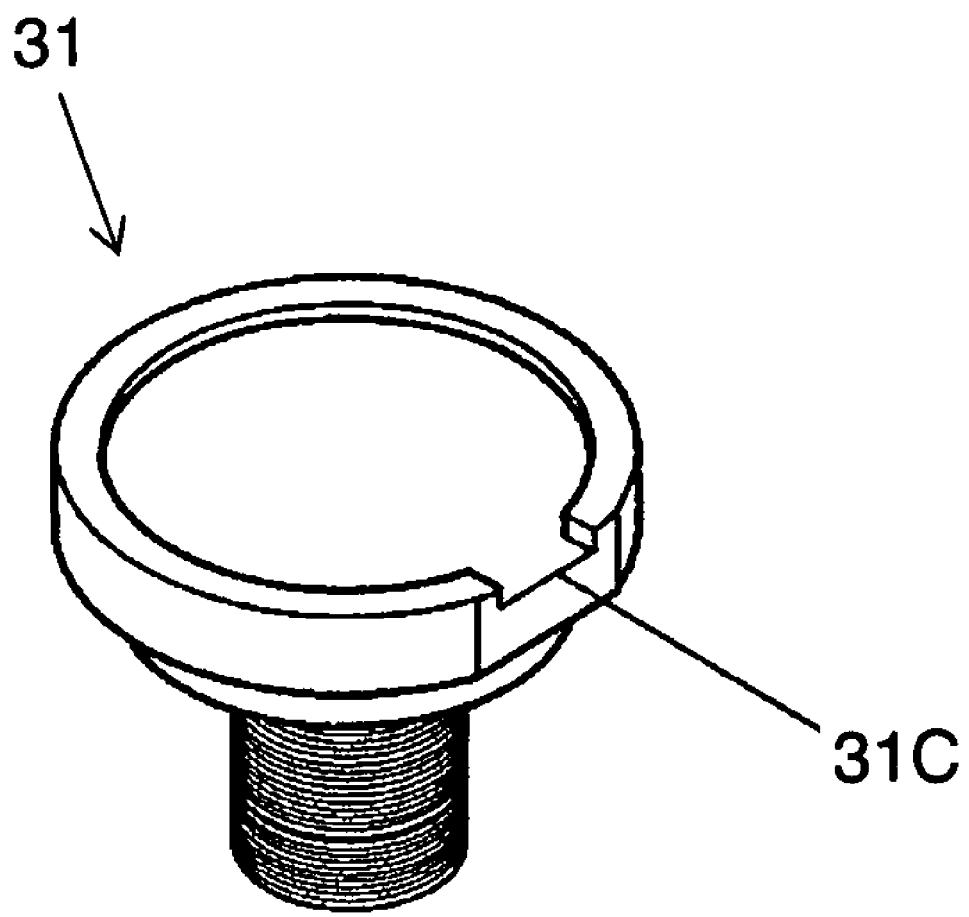
FIG. 4 is a perspective view showing a further second fixed member in the strain detector according to Embodiment 1 of the invention.

In order to fix fixed members 21 and 31 to substrate 11, a welding method other than laser welding and a method by adhesion may be used. Fixed members 21, 31 may be arranged upside down on substrate 11. In this case, as shown in FIG. 4, it is necessary to provide notch portion 31C on fixed member 31 in a position facing circuit portion 11N in order to avoid interference with wiring electrode 11B provided on substrate 11 and protective film 11D. In a word, notch portion 31C prevents fixed member 31 from getting on wiring electrode 11B and protective film 11D.

Substrate 11 and fixed members 21, 31 desirably correspond to each other in coefficient of thermal expansion. That is, fixed members 21, 31 are also preferably made of stainless steel. Thereby, welded portions of fixed members 21, 31 and substrate 11 are resistant to breakage due to thermal expansion. IC may be provided on circuit portion 11N to correct variation of strain resistance elements 11C in value of resistance. By using this, accuracy in calculation of load (strain) is improved.

Next, an operation of the strain detector is discussed according to the embodiment. First, fixed member 31 is mounted to a mount member (not shown) by threaded portion 31B. Subsequently, when fixed member 21 receives a load from a measuring object mounted by threaded portion 21B, a beam, which is provided on substrate 11, bends by an outer periphery of a bottom surface of columnar portion 21A and an inner periphery of convex portion 31A. Strain by such bending causes strain resistance elements 11C to vary in value of resistance. Since strain resistance elements 11C constitutes a bridge circuit with wiring electrode 11B, output is varied according to strain. In this manner, a load from a measuring object is obtained as a change in output. The change in output, which is thus obtained, is subjected to arithmetic processing by a processing circuit (not shown) to be converted into a load.

As described above, according to the embodiment, fixed members 21, 31 are fixed integrally to substrate 11. Thereby, there is no displacement in the fixed position even when a shock is applied, so that a fixed length constructed as a beam is not varied. Thereby, the strain detector is hard to vary in characteristics such as sensitivity and 0-point voltage, so that stable characteristics are maintained.

While four strain resistance elements 11C are used in the present embodiment, a bridge circuit may be constituted by the use of at least two strain resistance elements 11C and a fixed resistance. Threaded portions 21B, 31B are not necessary when mounting fixed members 21, 31 to a mount member or a measuring object by other methods.

Embodiment 2

Figure 5:
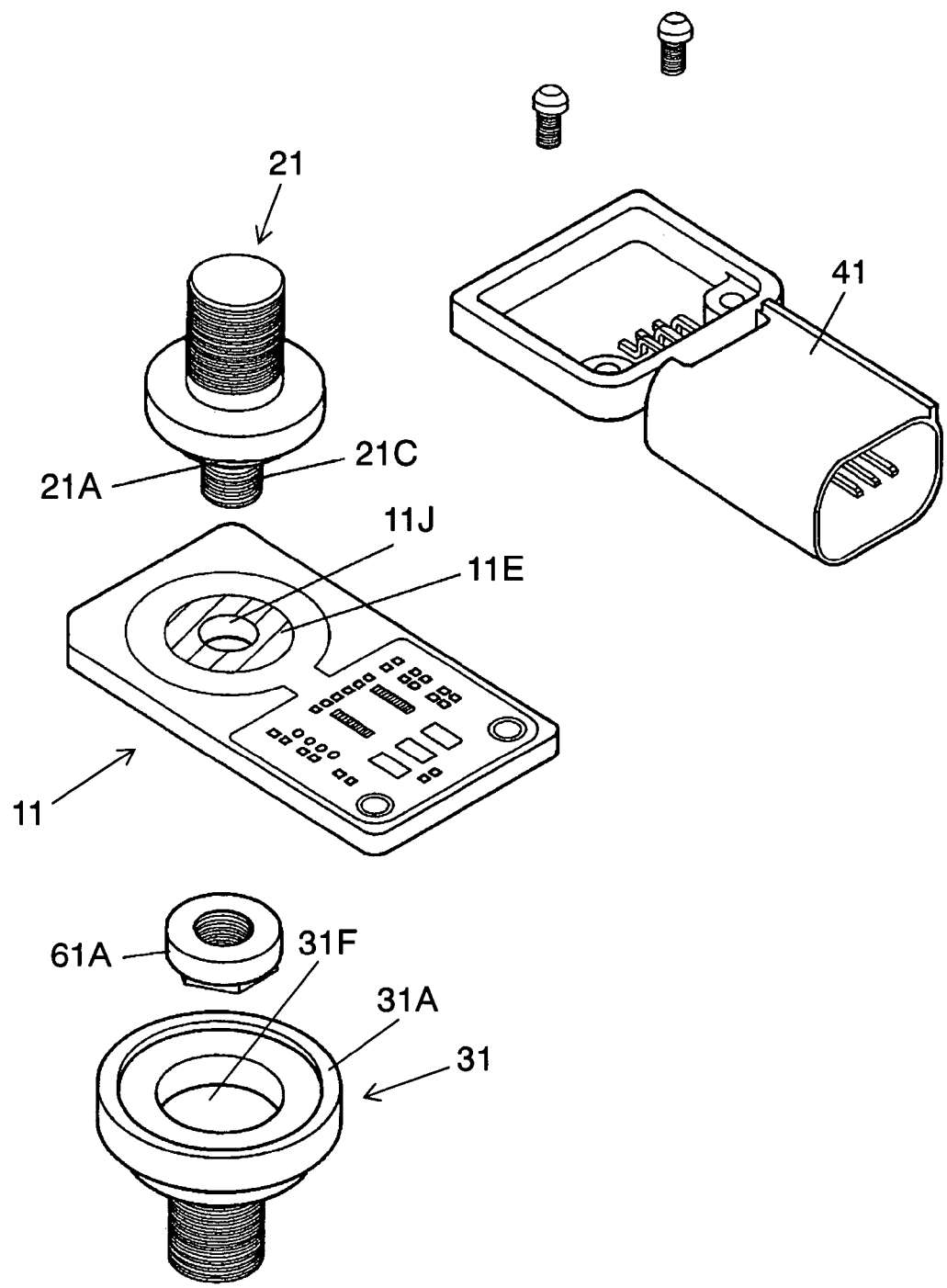
FIG. 5 is an exploded perspective view showing a strain detector according to Embodiment 2 of the invention.

FIG. 5 is an exploded perspective view showing a strain detector according to Embodiment 2 of the invention. The present embodiment is different from Embodiment 1 in that hole 11J is provided centrally of area 11E for fixation of substrate 11. Fixed member 21 is provided with threaded portion 21C at a bottom of columnar portion 21A. An inside diameter of hole 11J is larger than an outside diameter of threaded portion 21C but smaller than an outside diameter of columnar portion 21A. Fixed member 31 is provided with concave portion 31F inside convex portion 31A. Fastening member 61A for engaging with threaded portion 21C is fitted into concave portion 31F. The present embodiment is the same as Embodiment 1 except the matter described above.

An assembly of the construction peculiar to the present embodiment is described briefly. Threaded portion 21C is inserted through hole 11J and threaded portion 21C as inserted is clamped and fixed to substrate 11 by fastening member 61A. Thereafter, substrate 11 and fixed member 21 are fixed integrally so that an axis of fixed member 21 and a center of area 11E substantially correspond to each other. At this time a laser is used to weld a corner portion defined by area 11B and columnar portion 21A.

Fixed member 31 is fixed integrally to substrate 11 so that fastening member 61A is accommodated (covered) by concave portion 31F. At this time, the fastening member is arranged so that a center of an axis of fixed member 21 and a center of an axis of fixed member 31 correspond to each other.

This construction lessens the load on fixed member 21 and increases a fracture limit value in a fixed position when applying a shock. Clamping and fixation by fastening member 61A may be performed after welding. Looseness of fastening member 61A is prevented by integrally fixing fastening member 61A to substrate 11 by, for example, laser welding, so that the fracture limit value is increased.

Instead of providing fastening member 61A, fixed members 21, 31 may be fixed and fixed member 21 may be clamped and fixed to substrate 11 by providing a female thread at a center of fixed member 31 and clamping threaded portion 21C to the female thread. Alternatively, fixed member 21 and substrate 11 may be fixed together by providing a female thread in place of hole 11J and clamping threaded portion 21C to the female thread.

Figure 6:
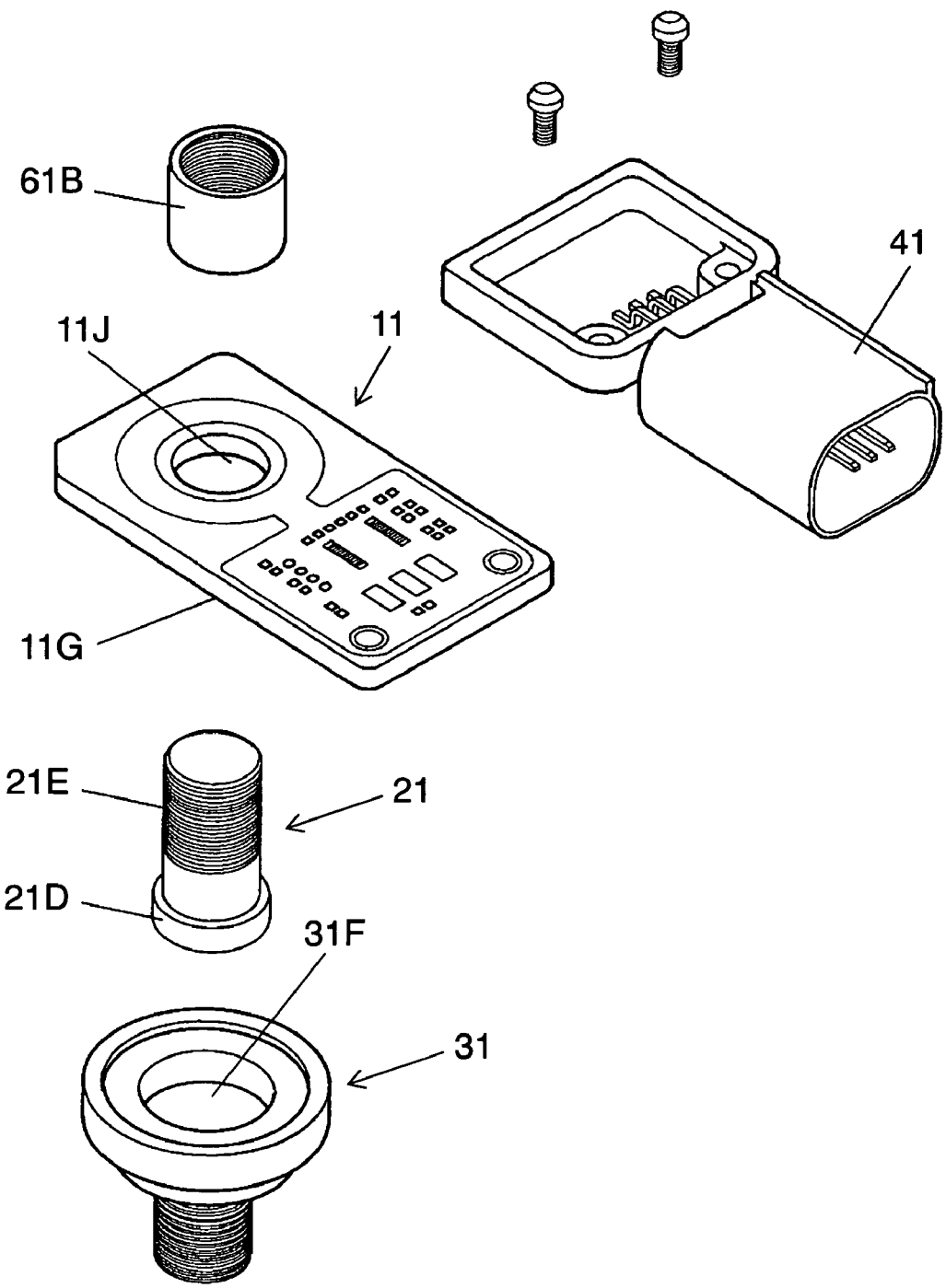
FIG. 6 is an exploded perspective view showing an other strain detector according to Embodiment 2 of the invention.

As shown in FIG. 6, a construction, in which first fixed member 21 and fastening member are arranged upside down, is capable. Fixed member 21 is provided with flange portion 21D and threaded portion 21E. With such construction, after fixed member 21 is inserted into through hole 11J of substrate 11 from a lower surface side of substrate 11, flange portion 21D of fixed member 21 and area 11G of substrate 11 are fixed together by, for example, laser welding. Threaded portion 21E is clamped and fixed to substrate 11 by fastening member 61B. Flange portion 21D is dimensioned to be accommodated in (covered by) concave portion 31F. With such construction, a fracture limit value in a fixed position in a case of applying a shock is increased in the same manner as described above.

In the case where an adequate strength is obtained by threaded portion 21C and fastening member 61A, or threaded portion 21E and fastening member 61B, it is not required that fixed member 21 and substrate 11 be welded together. In this case, preferably, substrate 11 as welded and fixed member 31 agree substantially with each other in coefficient of thermal expansion.

Embodiment 3

Figure 7:
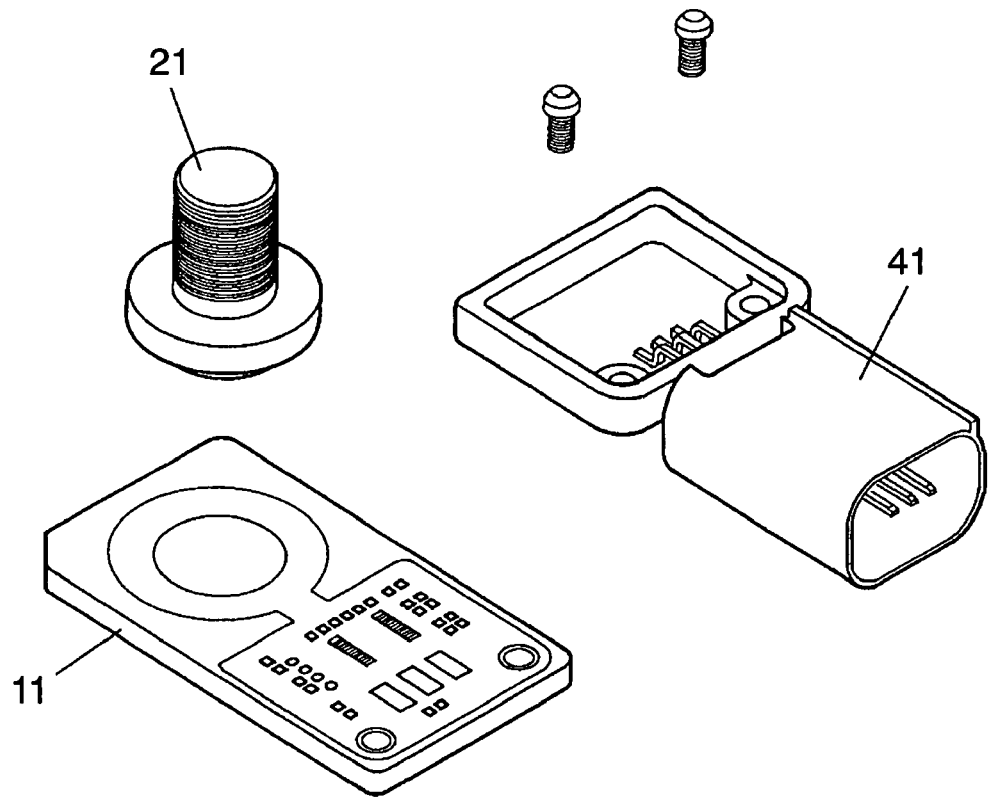
FIG. 7 is an exploded perspective view showing a strain detector according to Embodiment 3 of the invention.
Figure 7:
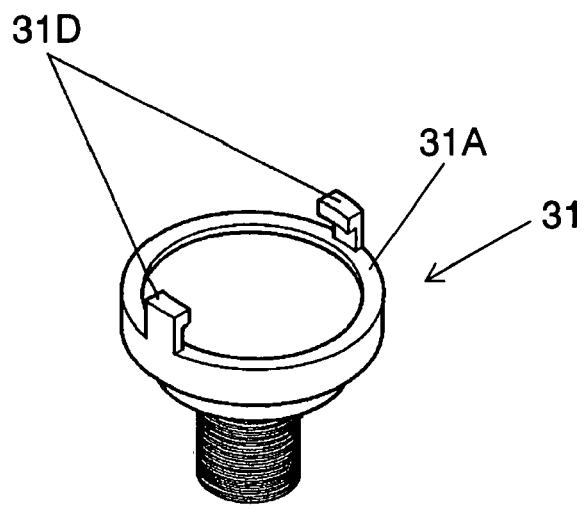
Figure 8:
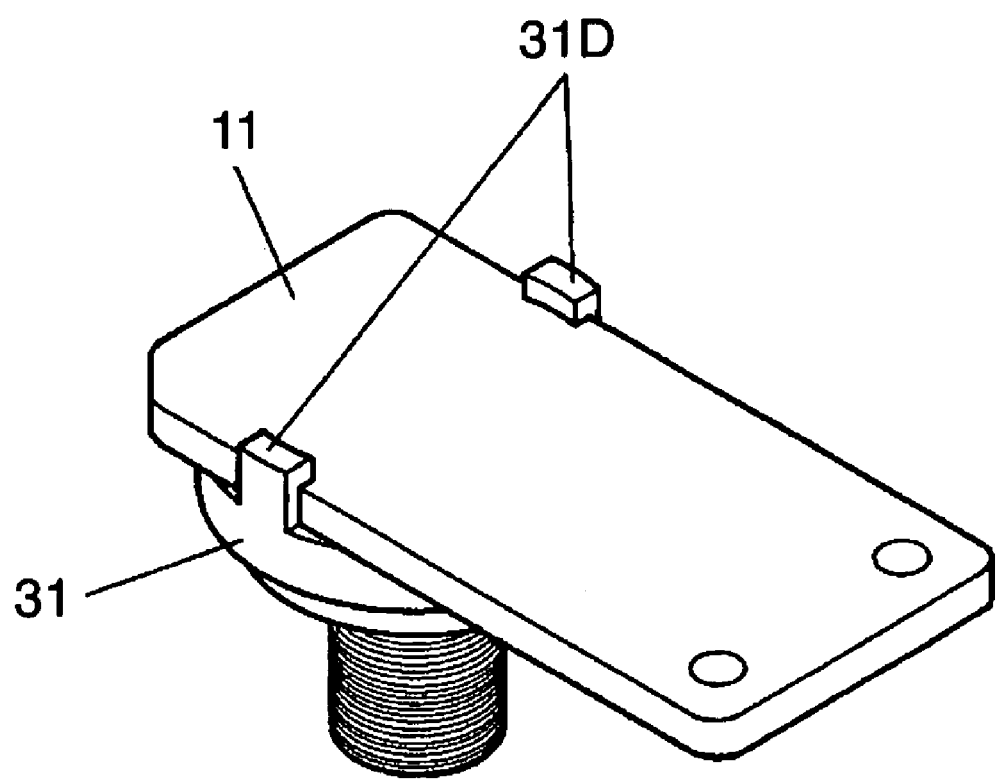
FIG. 8 is a perspective view showing an arrangement of a substrate and a second fixed member in the strain detector shown in FIG. 7.

FIG. 7 is an exploded perspective view showing a strain detector according to Embodiment 3 of the invention. FIG. 8 is a perspective view showing an arrangement of a substrate and a second fixed member in the strain detector shown in FIG. 7. In FIG. 8, insulating layer 11A formed on an upper surface (i.e., the first surface of substrate 11) or the like is omitted. The present embodiment is different from Embodiment 1 in that guide portions 31D are provided in two symmetrical locations on convex portion 31A of fixed member 31. The present embodiment is the same as Embodiment 1 except the matter described above.

As shown in FIG. 8, substrate 11 is inserted into guide portions 31D, and fixed member 31 and substrate 11 are fixed integrally by, for example, laser welding. With such construction, even when welds of fixed member 31 and substrate 11 are broken, fixed member 31 is held mechanically on substrate 11.

In addition, guide portions 31D may be provided outside convex portion 31A instead of being provided on convex portion 31A of fixed member 31. Guide portions 31D are not necessarily provided in two symmetrical locations on convex portion 31A. It suffices that guide portions 31D, into which substrate 11 is inserted, be provided on the side, where substrate 11 is fixed, of fixed member 31.

Embodiment 4

Figure 9:
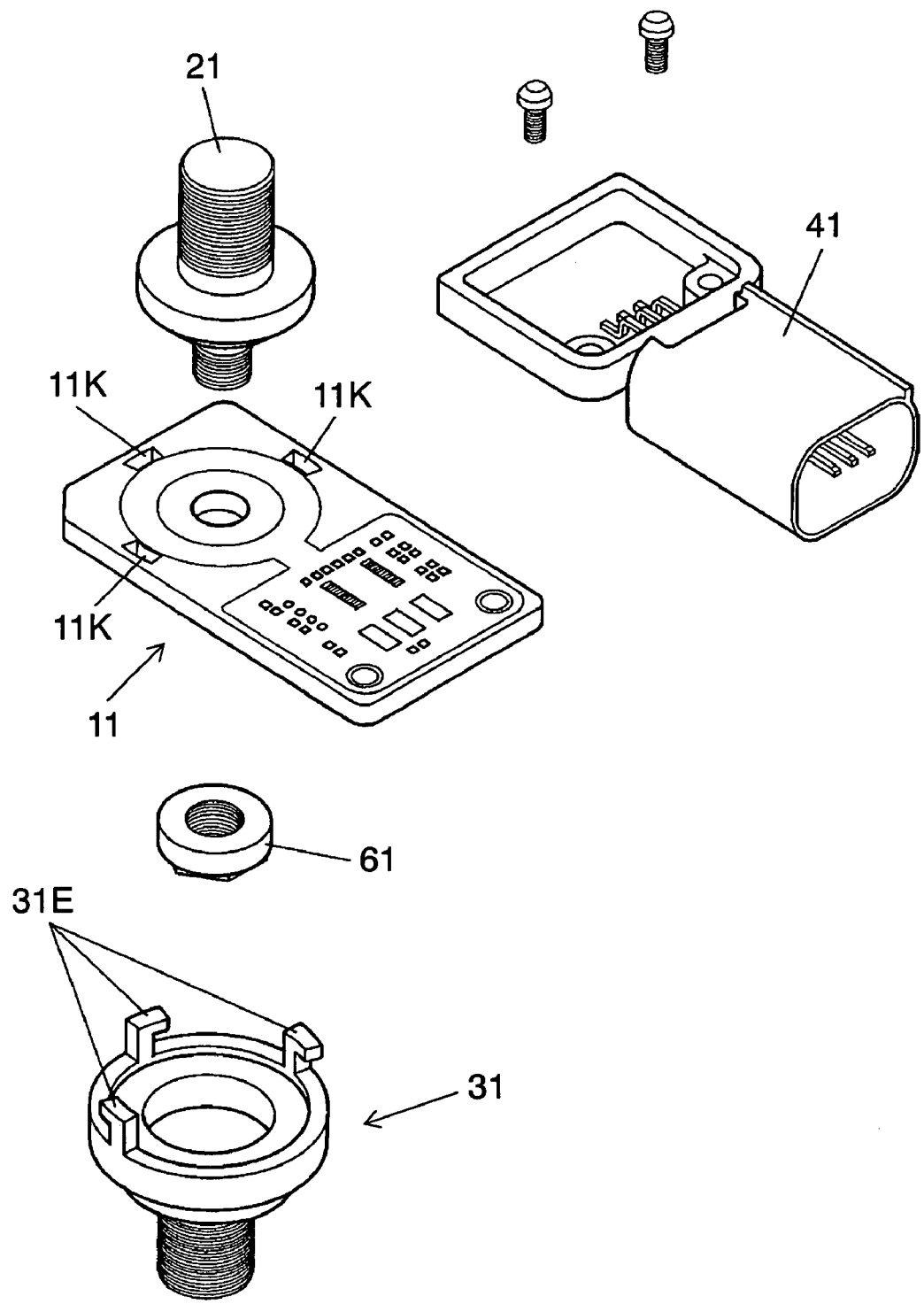
FIG. 9 is an exploded perspective view showing a strain detector according to Embodiment 4 of the invention.
Figure 10:
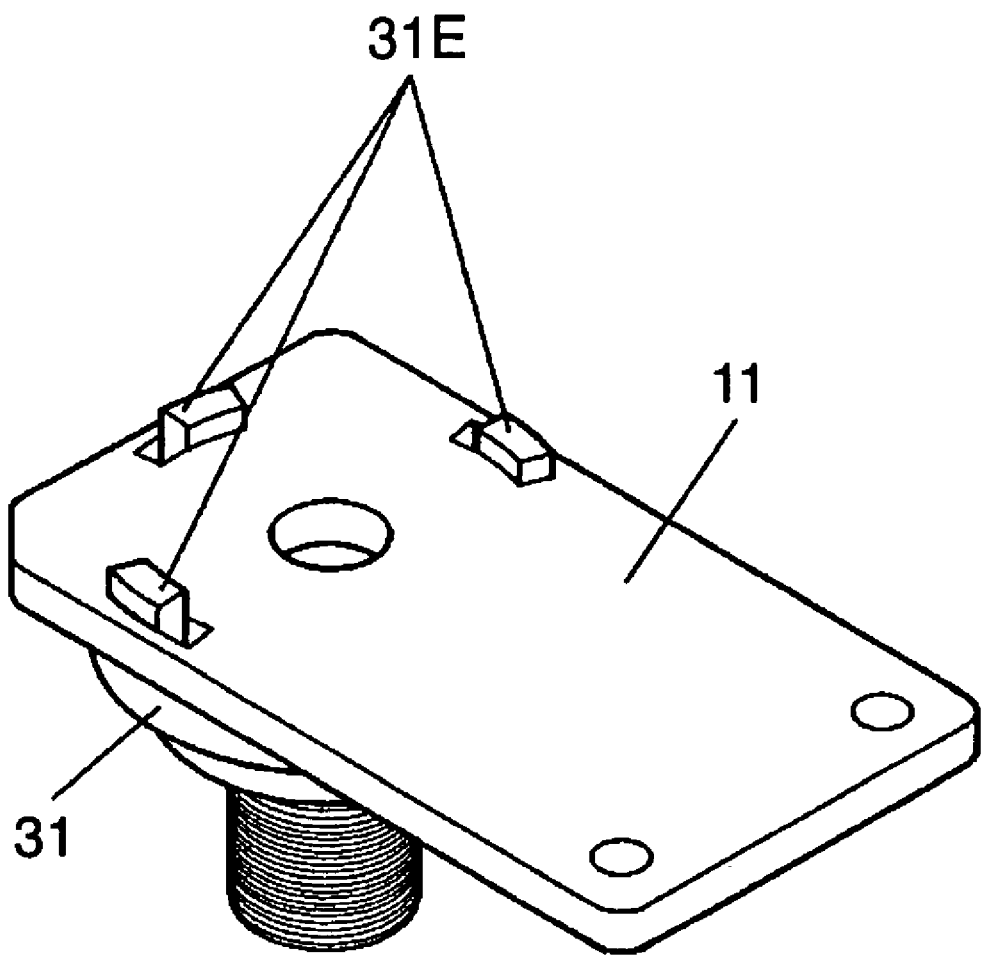
FIG. 10 is a perspective view showing an arrangement of a substrate and a second fixed member in the strain detector shown in FIG. 9.

FIG. 9 is an exploded perspective view showing a strain detector according to Embodiment 4 of the invention. FIG. 10 is a perspective view showing an arrangement of a substrate and a second fixed member in the strain detector shown in FIG. 9. In FIG. 10, insulating layer 11A formed on an upper surface (i.e., the first surface of substrate 11) or the like is omitted. The present embodiment is different from Embodiment 2 in that insertion holes 11K are provided on substrate 11 and hook portions 31E are provided on convex portion 31A of fixed member 31. The present embodiment is the same as Embodiment 2 except the matter described above.

By inserting hook portions 31E into insertion holes 11K and rotating it, fixed member 31 is suspended from substrate 11 as shown in FIG. 10. After fixed member 31 is thus assembled to substrate 11, it is fixed integrally to substrate 11 by, for example, laser welding. With such construction, even when welds of fixed member 31 and substrate 11 are broken, fixed member 31 is held mechanically on substrate 11.

While three sets of insertion holes 11K and hook portions 31E are provided as shown in FIG. 9, only one set produces the above effect provided that fixed member 31 and substrate 11 are welded together. However, two or more sets are preferably provided. Hook portions 31E may be provided outside convex portion 31A instead of being provided on convex portion 31A. That is, it suffices that the hook portions be provided on the side to be fixed to substrate 11. The construction may be applied to the construction of Embodiment 1.

In addition, preferably, in Embodiments 3 and 4, substrate 11 as welded and fixed member 21 agree substantially with each other in coefficient of thermal expansion.

Embodiment 5

Figure 11:
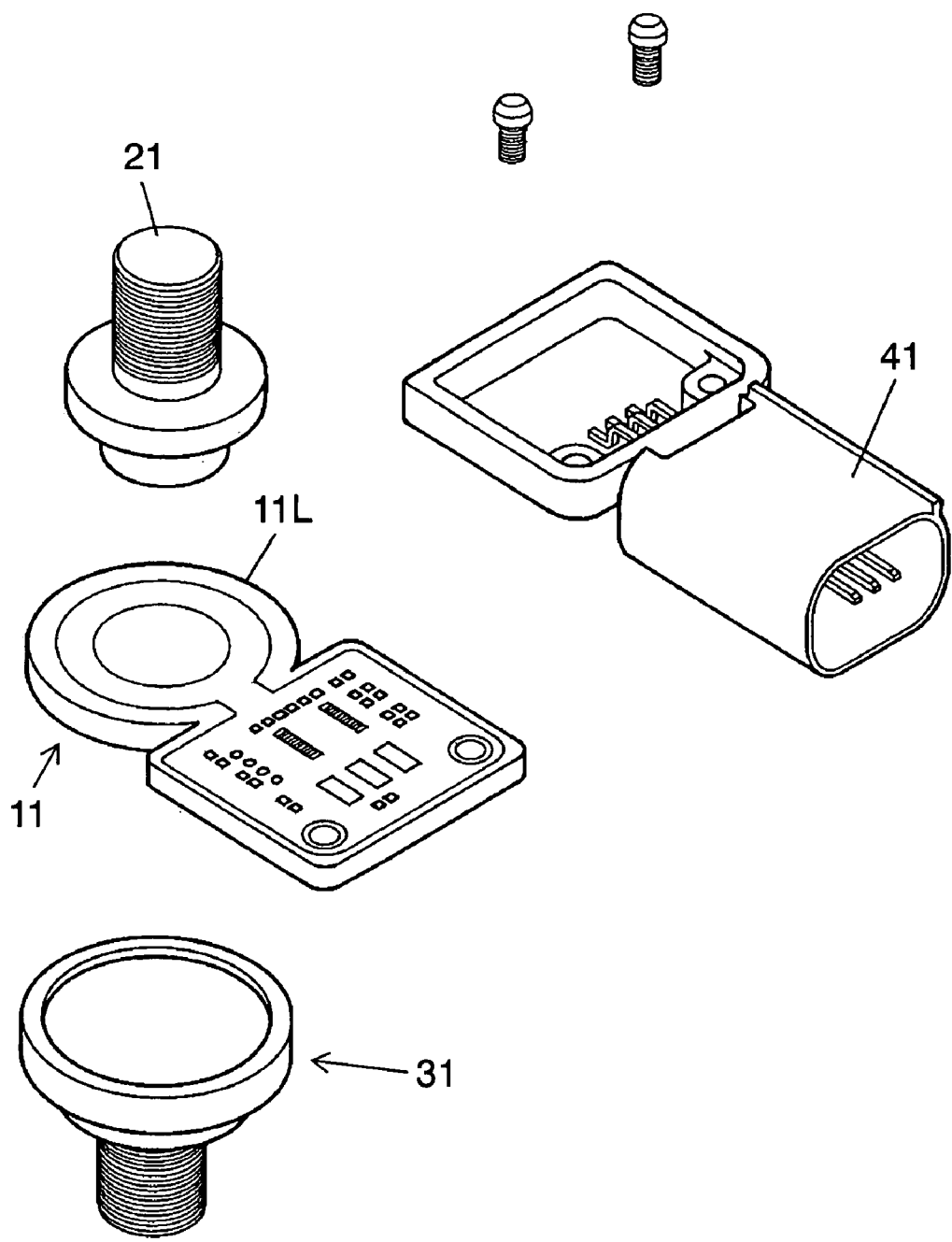
FIG. 11 is an exploded perspective view showing a strain detector according to Embodiment 5 of the invention.
Figure 12:
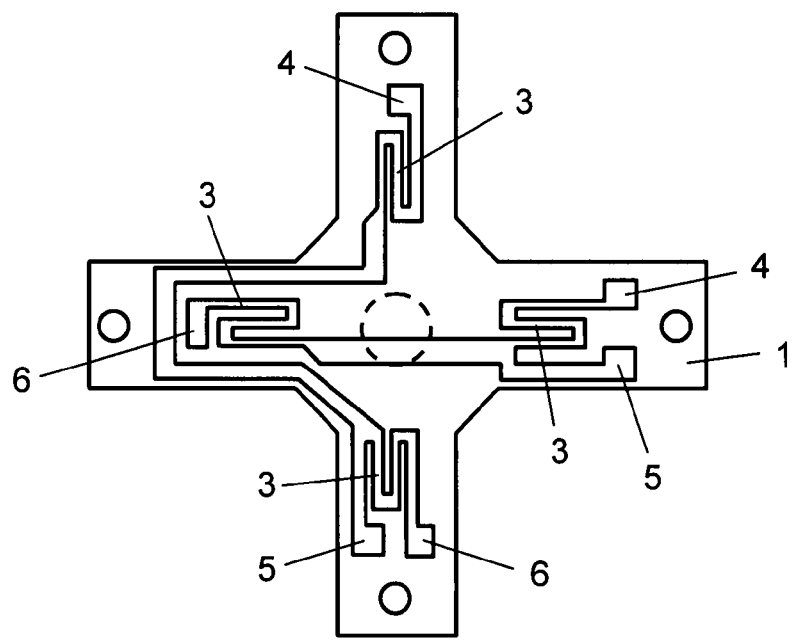
FIG. 12 is a bottom view showing a conventional strain detector.
Figure 13:
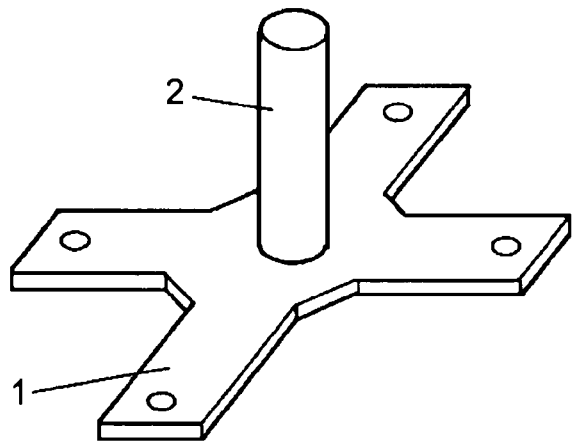
FIG. 13 is a perspective view showing the conventional strain detector.
Figure 14:
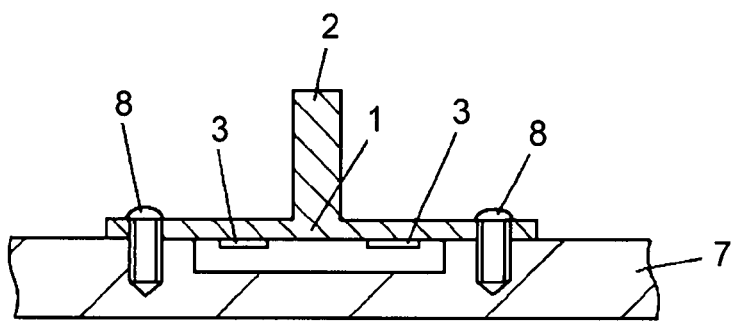
FIG. 14 is a cross sectional view showing a state, in which the conventional strain detector is mounted.

FIG. 11 is an exploded perspective view showing a strain detector according to Embodiment 5 of the invention. The present embodiment is different from Embodiment 1 in that mount 11L for fixed members 21, 31 at substrate 11 is formed to have the same external shape as that of fixed member 31. With such construction, fixed member 31 and mount 11L are configured to butt against each other at the time of, for example, laser welding, so that weld depth can be obtained efficiently. Therefore, fixed member 31 and substrate 11 are improved in weld strength, and a fracture limit value in a fixed position when applying a shock is increased. The present construction may be applied to the construction of Embodiments 2 to 4.

INDUSTRIAL APPLICABILITY

With the strain detector according to the invention, the length of a beam constructed at the time of assembly is hard to vary. Therefore, the strain detector is stable in characteristics and useful in application to a strain detector, in which accuracy in output signal is needed, or the like.

The invention claimed is:

1. A strain detector comprising:
a substrate having a mounting area;
a first fixed member fixed to the mounting area of the substrate on a first surface of the substrate, the first fixed member having a first longitudinal axis located at a center of the mounting area;
a second fixed member fixed to a second surface of the substrate, the second surface of the substrate being opposed to the first surface, the second fixed member having a second longitudinal axis coaxial with the first longitudinal axis;
a bridge circuit provided on the substrate and including at least two strain resistance elements, the strain resistance elements being disposed outside of the mounting area in a radial direction relative to the first longitudinal axis; and
a circuit portion provided on the substrate, the circuit portion being electrically connected to the strain resistance elements,
wherein the second fixed member is fixed to the second surface of the substrate at a region disposed outside of the strain resistance elements in a radial direction relative to the first longitudinal axis,
wherein at least one of the first fixed member and the second fixed member is fixed to the substrate by one of welding and adhesion,
wherein the second fixed member is fixed to the substrate by one of welding and adhesion, and
wherein a periphery of the substrate in a region where the second fixed member is fixed is flush with a periphery of the second fixed member such that the periphery of the substrate and the periphery of the second fixed member form a flat edge for welding or adhesion.

2. A strain detector comprising:
a substrate having a mounting area;
a first fixed member fixed to the mounting area of the substrate on a first surface of the substrate, the first fixed member having a first longitudinal axis located at the center of the mounting area;
a second fixed member fixed to a second surface of the substrate, the second surface of the substrate being opposed to the first surface, the second fixed member having a second longitudinal axis coaxial with the first longitudinal axis;
a bridge circuit provided on the substrate and including at least two strain resistance elements, the strain resistance elements being disposed outside of the mounting area in a radial direction relative to the first longitudinal axis; and
a circuit portion provided on the substrate, the circuit portion being electrically connected to the strain resistance elements,
wherein the second fixed member is fixed to the second surface of the substrate at a region disposed outside of the strain resistance elements in a radial direction relative to the first longitudinal axis, and
wherein at least one of the first fixed member and the second fixed member is fixed to the substrate by one of welding and adhesion, and has a coefficient of thermal expansion substantially equal to a coefficient of thermal expansion of the substrate.

3. A strain detector comprising:
a substrate having a mounting area;
a first fixed member fixed to the mounting area of the substrate on a first surface of the substrate, the first fixed member having a first longitudinal axis located at a center of the mounting area;
a second fixed member fixed to a second surface of the substrate, the second surface of the substrate being opposed to the first surface, the second fixed member having a second longitudinal axis coaxial with the first longitudinal axis;
a bridge circuit provided on the substrate and including at least two strain resistance elements, the strain resistance elements being disposed outside of the mounting area in a radial direction relative to the first longitudinal axis; and
a circuit portion provided on the substrate, the circuit portion being electrically connected to the strain resistance elements,
wherein the second fixed member is fixed to the second surface of the substrate at a region disposed outside of the strain resistance elements in a radial direction relative to the first longitudinal axis, and
wherein the substrate is provided with a hole at the center of the mounting area, the first fixed member has a threaded portion disposed in the hole, and the first fixed member is clamped and fixed to the substrate at the threaded portion.

4. The strain detector according to claim 3, further comprising a fastening member which engages with the threaded portion.

5. A strain detector comprising:
a substrate having a mounting area;
a first fixed member fixed to the mounting area of the substrate on a first surface of the substrate, the first fixed member having a first longitudinal axis located at the center of the mounting area;
a second fixed member fixed to a second surface of the substrate, the second surface of the substrate being opposed to the first surface, the second fixed member having a second longitudinal axis coaxial with the first longitudinal axis;
a bridge circuit provided on the substrate and including at least two strain resistance elements, the strain resistance elements being disposed outside of the mounting area in a radial direction relative to the first longitudinal axis; and
a circuit portion provided on the substrate, the circuit portion being electrically connected to the strain resistance elements, and
wherein the second fixed member is fixed to the second surface of the substrate at a region disposed outside of the strain resistance elements in a radial direction relative to the first longitudinal axis,
wherein the second fixed member includes a ring-shaped convex portion fixed to the substrate, a notch portion is provided on the convex portion in a position facing the circuit portion, and wherein the strain resistance elements are disposed on the second surface of the substrate.

6. A strain detector comprising:
a substrate having a mounting area;
a first fixed member fixed to the mounting area of the substrate on a first surface of the substrate, the first fixed member having a first longitudinal axis located at a center of the mounting area;
a second fixed member fixed to a second surface of the substrate, the second surface of the substrate being opposed to the first surface, the second fixed member having a second longitudinal axis coaxial with the first longitudinal axis;

a bridge circuit provided on the substrate and including at least two strain resistance elements, the strain resistance elements being disposed outside of the mounting area in a radial direction relative to the first longitudinal axis; and a circuit portion provided on the substrate, the circuit portion being electrically connected to the strain resistance elements, wherein the second fixed member is fixed to the second surface of the substrate at a region disposed outside of the strain resistance elements in a radial direction relative to the first longitudinal axis, and wherein the second fixed member includes a guide portion into which the substrate is inserted, the guide portion extending from the second surface of the substrate to the first surface of the substrate.

7. A strain detector comprising:

a substrate having a mounting area;

a first fixed member fixed to the mounting area of the substrate on a first surface of the substrate, the first fixed member having a first longitudinal axis located at the center of the mounting area;

a second fixed member fixed to a second surface of the substrate, the second surface of the substrate being opposed to the first surface, the second fixed member having a second longitudinal axis coaxial with the first longitudinal axis;

a bridge circuit provided on the substrate and including at least two strain resistance elements, the strain resistance elements being disposed outside of the mounting area in a radial direction relative to the first longitudinal axis; and a circuit portion provided on the substrate, the circuit portion being electrically connected to the strain resistance elements, wherein the second fixed member is fixed to the second surface of the substrate at a region disposed outside of the strain resistance elements in a radial direction relative to the first longitudinal axis, and wherein the substrate includes at least one insertion hole, and the second fixed member includes at least one hook portion extending through the insertion hole such that the second fixed member is suspended from the substrate.

8. A strain detector comprising:

a substrate having a mounting area;

a first fixed member fixed to the mounting area of the substrate on a first surface of the substrate, the first fixed member having a first longitudinal axis located at a center of the mounting area;

a second fixed member fixed to a second surface of the substrate, the second surface of the substrate being opposed to the first surface, the second fixed member having a second longitudinal axis coaxial with the first longitudinal axis;

a bridge circuit provided on the substrate and including at least two strain resistance elements, the strain resistance elements being disposed outside of the mounting area in a radial direction relative to the first longitudinal axis; and a circuit portion provided on the substrate, the circuit portion being electrically connected to the strain resistance elements, wherein the second fixed member is fixed to the second surface of the substrate at a region disposed outside of the strain resistance elements in a radial direction relative to the first longitudinal axis, wherein the substrate includes an outer periphery disposed between the first surface of the substrate and the second surface of the substrate, and wherein the second fixed member includes a guide portion into which the substrate is inserted, the guide portion extending from the second surface of the substrate around the outer periphery and contacting the first surface of the substrate such that the second fixed member is held to the substrate.

9. A strain detector comprising:

a substrate having a mounting area;

a first fixed member fixed to the mounting area of the substrate on a first surface of the substrate, the first fixed member having a first longitudinal axis located at a center of the mounting area;

a second fixed member fixed to a second surface of the substrate, the second surface of the substrate being opposed to the first surface, the second fixed member having a second longitudinal axis coaxial with the first longitudinal axis;

a bridge circuit provided on the substrate and including at least two strain resistance elements, the strain resistance elements being disposed outside of the mounting area in a radial direction relative to the first longitudinal axis; and a circuit portion provided on the substrate, the circuit portion being electrically connected to the strain resistance elements, wherein the second fixed member is fixed to the second surface of the substrate at a region disposed outside of the strain resistance elements in a radial direction relative to the first longitudinal axis, wherein the substrate includes a plurality of insertion holes, and wherein the second fixed member includes a plurality of hook portions, each hook portion of the plurality of hook portions extending through an insertion hole of the plurality of insertion holes such that the second fixed member is suspended from the substrate.

* * * * *